Dec. 18, 1923.
G. A. BERGLUND
1,478,200
FOOD SLICING MACHINE
Filed March 17, 1923        2 Sheets-Sheet 1
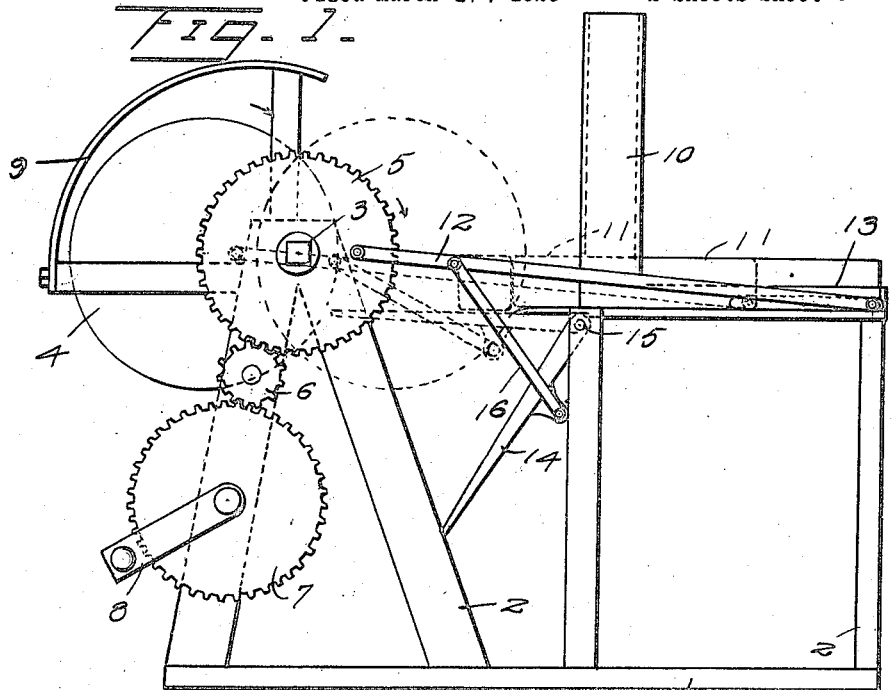
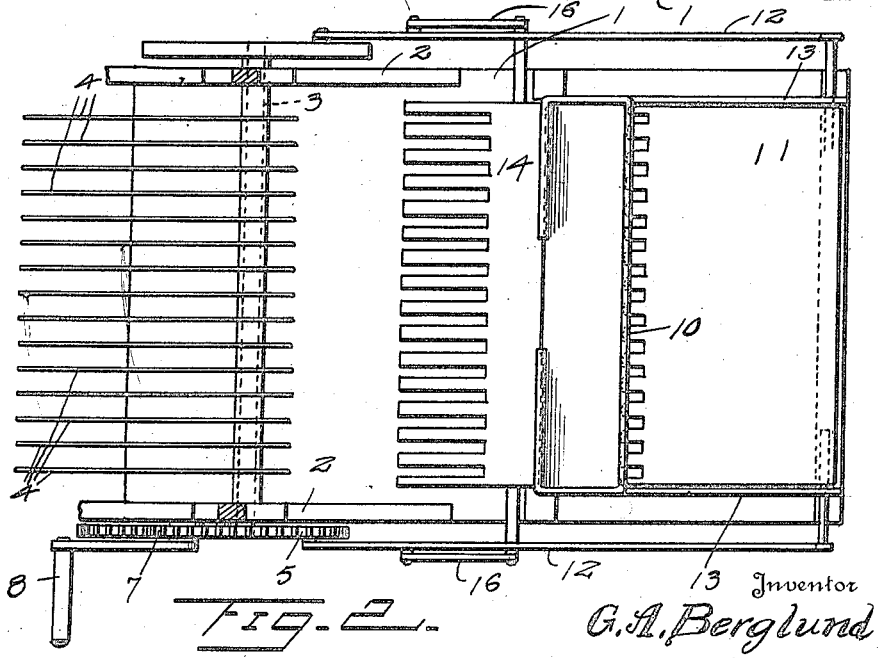
Inventor
G. A. Berglund Dec. 18, 1923.

G. A. BERGLUND

FOOD SLICING MACHINE

Filed March 17, 1923   2 Sheets-Sheet 2

1,478,200

Inventor
G. A. Berglund

Patented Dec. 18, 1923.

1,478,200

UNITED STATES PATENT OFFICE.

GUST A. BERGLUND, OF JOLIET, ILLINOIS.

FOOD-SLICING MACHINE.

Application filed March 17, 1923. Serial No. 625,784.

*To all whom it may concern:*

Be it known that I, GUST A. BERGLUND, a citizen of the United States, residing at Joliet, in the county of Will and State of Illinois, have invented certain new and useful Improvements in Food-Slicing Machines; and I do hereby declare the following to be a full, clear, and exact description of the invention, such as will enable others skilled in the art to which it appertains to make and use the same.

The invention has for its primary object the provision of a machine for slicing bread, but which is equally well adapted for slicing fruit, vegetables, meat and the like, the machine embodying a hopper or magazine to receive a number of the articles to be sliced, and said articles being automatically fed to the cutting mechanism which divides the article into uniform slices of predetermined thickness, said slices being automatically discharged so as not to interfere with the continuous operation of the machine which automatically feeds the article from the hopper, slices the same and delivers the slices into a suitable receptacle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a food slicing machine embodying the invention,

Figure 2 is a top plan view thereof,

Corresponding and like parts are referred to in the following description and designated in the several views of the drawings by like reference characters.

Figure 4:
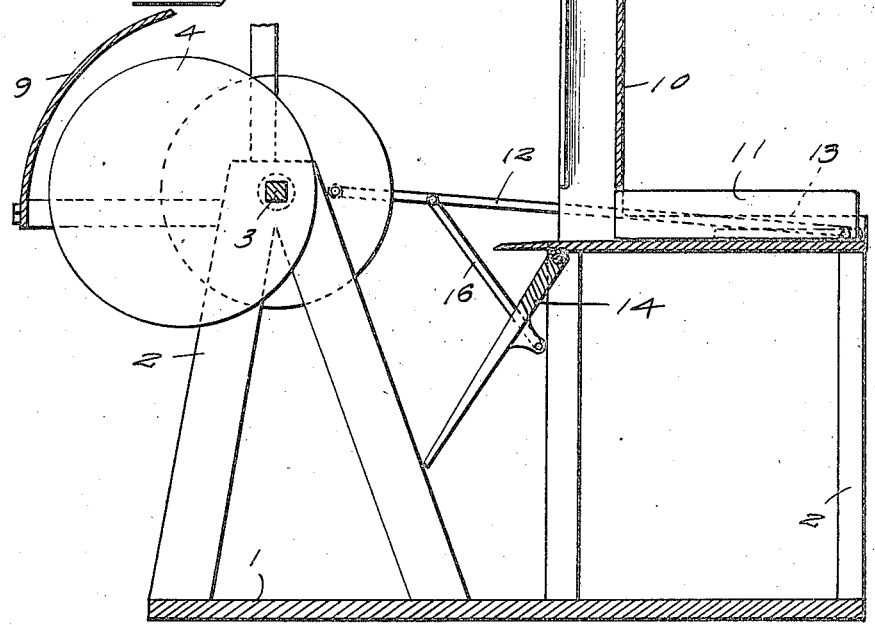
Figure 4 is a vertical central longitudinal section.
Figure 3:
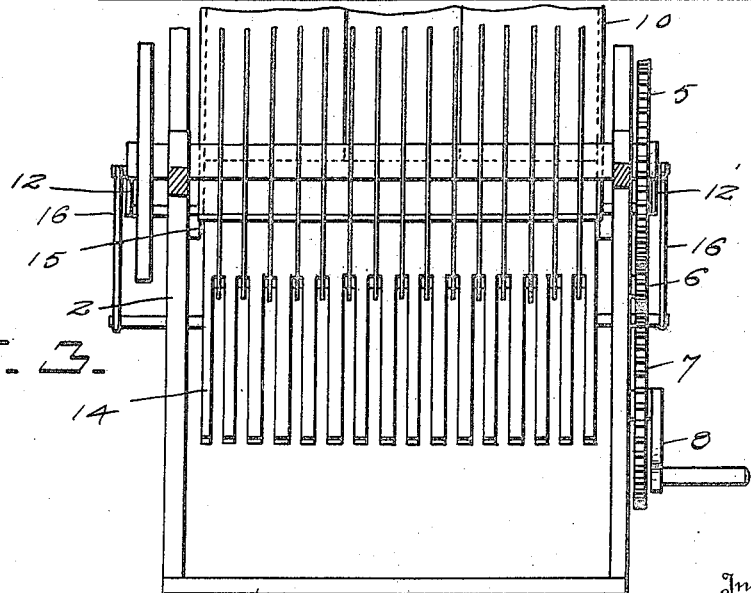
Figure 3 is a front view of the machine, the guard being broken away.

The machine embodies a base 1 and a framework 2 mounted thereon and embodying a plurality of uprights and ties. A transverse shaft 3 is mounted in suitable bearings at one end of the frame and receives a plurality of cutters 4 of circular formation and having an eccentric arrangement with reference to the shaft. The cutters 4 may be spaced apart any required distance according to the thickness of the slice to be formed. The shaft 3 may be rotated in any preferred way, either by having a power applied directly thereto or through intermediate gearing, such as a gear wheel 5 secured to an end of the shaft 3, an idler 6 and a gear wheel 7, the latter being operable by means of a crank 8 fitted thereto. A guard 9 extends over the top and front of the cutting mechanism and the operating gearing to prevent injury to the person and any object from coming in contact with such parts.

A hopper or magazine 10 is disposed some distance in the rear of the cutting mechanism and is adapted to receive a number of articles to be sliced. A plunger 11 is disposed to operate beneath the hopper 10 and deliver the bottom article therefrom to the cutting mechanism. During the forward movement of the plunger 11, the bottom article in the hopper 10 is advanced to the cutting mechanism, the remaining articles in the hopper being supported upon the plunger until the same returns to normal position, when the articles drop to bring the next or lowest one into position to be fed forward at the next advance movement of the plunger. A pitman or connection 12 couples the plunger to the gear wheel 5 or like part so that at each complete revolution of the shaft 3, the plunger 11 is moved forwardly and returned to normal position. The plunger 11 is mounted in a suitable guide 13 which directs it in its reciprocating movement.

A platform 14 pivoted at 15 is adapted to swing downwardly and upwardly and when at its highest position, it is about in line with the plunger 11 and supports the article during its advance to the cutting mechanism and during the operation thereof when forming the slices. A link 16 connects the pivoted platform 14 with the pitman 12, the parts being so arranged that upon the return stroke of the plunger 11, the platform 14 swings downwardly to discharge the slices into a suitable receptacle. The platform 14 approximates the formation of a grid so that its forward portion may extend between the cutters 4 and properly support the slices until the platform swings downwardly to discharge the same. It is to be understood that the cutters 4 may be of any formation and spaced apart any required distance, according to the thickness of the slices and the nature of the article to be sliced. It is also further observed that the pivoted platform 14 and the reciprocating plunger 11 may be connected with the shaft 3 to be operated thereby and said shaft and cutting mechanism may be rotated in any preferred way.

What is claimed is:

1. A rotary cutting mechanism embodying a shaft, and a plurality of cutters of circular formation eccentrically mounted upon the shaft and spaced apart a determinate distance.

2. In a slicing machine, a cutting mechanism and a pivoted platform adapted to support the article during the slicing operation and to swing downwardly and deliver the slices.

3. In a slicing machine, a rotary cutting mechanism, a pivoted platform having portions adapted to extend between the elements of the cutting mechanism, and a plunger adapted to operate across the platform and advance the article to be sliced to the cutting mechanism.

4. A slicing machine comprising a shaft, a plurality of cutters of circular formation eccentrically mounted upon the shaft, a pivoted platform having portions extending between the cutters, a hopper for receiving a number of articles to be sliced, a plunger mounted to reciprocate across the lower end of the hopper and over the pivoted platform, and connecting means between the plunger, pivoted platform and cutting mechanism to effect simultaneous operation thereof.

5. A slicing machine comprising a cutting mechanism, a pivoted platform having portions extending between the elements of the cutting mechanism, a plunger mounted to reciprocate over the pivoted platform, a connecting means between the plunger and cutting mechanism to operate the plunger from the cutting mechanism, and a connecting means between the connecting means first named and the pivoted platform, said last named connecting means serving to swing said platform on its pivot into and out of position where the plunger may be reciprocated over it.

In testimony whereof I affix my signature in the presence of two witnesses.

GUST A. BERGLUND.

Witnesses:
 MAX SHLENSKY,
 PETER N. KRAUS.